Patented Feb. 17, 1925.

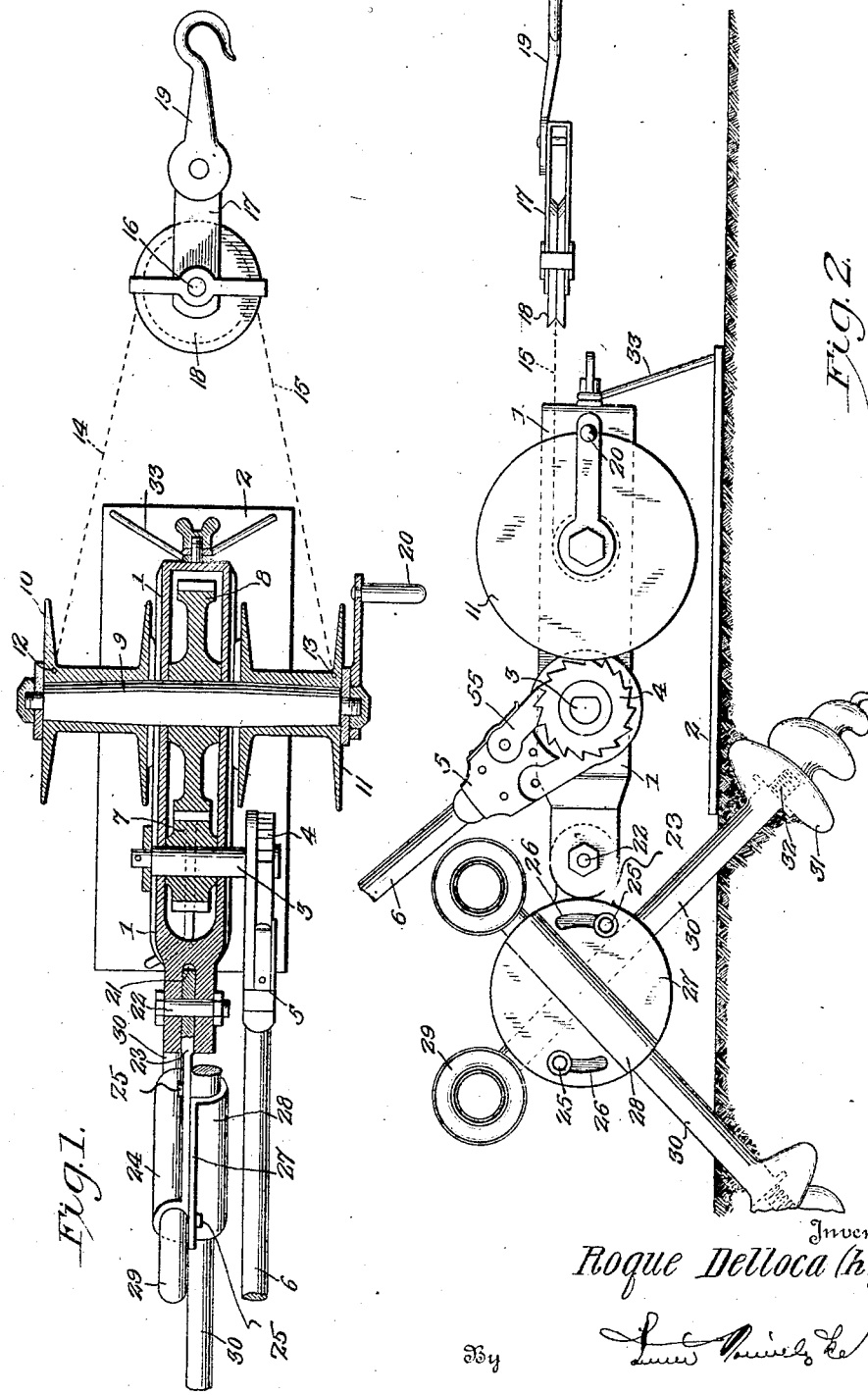

1,526,630

UNITED STATES PATENT OFFICE.

ROQUE DELLOCA (HIJO), OF LA PLATA, ARGENTINA.

VEHICLE PULLER.

Application filed December 6, 1922. Serial No. 605,222.

*To all whom it may concern:*

Be it known that I, ROQUE DELLOCA (Hijo), citizen of the Republic of Argentina, residing at 44th Street, No. 550, La Plata, Republic of Argentina, have invented certain new and useful Improvements in Vehicle Pullers, of which the following is a specification.

This invention relates to an apparatus for drawing motor-cars and all others kinds of vehicles out from pools, marshes, morasses or the like, its object being to provide an efficient apparatus of simple construction which may be advantageously used for the above purpose.

Many different types of apparatus have been proposed for the above purpose, but in all of them the power of the vehicle is used for operating the apparatus, which limits the usefulness of the apparatus to vehicles provided with power units. Such apparatus show, moreover, the drawbacks that they cannot be used when the motor is out of order and that the engine suffers a great strain at the moment when it is exerting its maximum effort and the resistance ceases by the drawing out of the vehicle.

The apparatus according to my present invention eliminates all the above drawbacks, and by the fact of it being operated by hand it obtains the great advantage of being adaptable to use in connection not only with motor cars, but with all other vehicles and the like.

In order that my present invention may be clearly understood and easily carried into practice, a preferred embodiment of the same has been shown in the accompanying drawings, wherein:

Figure 1 is a part sectional plan view of the apparatus, and Figure 2 is a side elevation of the same.

Similar characters of reference denote the same or like parts throughout the said drawings.

In the embodiment shown, 1 is a substantially rectangular frame having at one end two arms 33 which support a wooden or like base or foundation 2, so as to avoid direct contact of the working parts of the apparatus with the soil.

Said frame is traversed by a bolt 3 on which the toothed wheel 7 is keyed, said bolt being held in position by a pin or the like. On the outer end of the said bolt or axle there is suitably mounted a ratchet lever 5 carrying a pawl 55 which acts on the ratchet wheel 4, said lever being operated by the arm 6. The working of this ratchet device is obvious.

The toothed wheel 7 meshes with another toothed wheel 8 of larger diameter which is keyed on an axle 9 turning in suitable bearings on the frame 1, said axle protruding at both sides of the frame and having secured to it drums 10 and 11, to which there are suitably fixed at 12 and 13 the ends of the two branches 14 and 15 of a cable or rope of suitable resistance which is passed around a pulley 18 turning freely on an axle 16 which is supported by a fork 17 provided at the opposite end with a hook 19.

Said pulley is used in order to equalize the draft of the cable, and the hook 19 is hooked to any suitable point of the vehicle when the apparatus is to be used.

The outer end of the axle 9 may carry a handle 20 which, when the apparatus is in working position, allows a stretching of the cable, so that the ratchet device need only be used for proper action in extricating the vehicle from the obstacle.

The frame 1 has at the opposite end from the arms 33 a forked opening 21 in which, by means of a bolt 22 there is linked a piece 23 having a curved portion or socket 24 in which a fastening bar or post 30 may be fitted. 27 is a symmetrical piece having a curved portion 28. The piece 27 has two arcuate slots 26 in which stops 25 carried by piece 23 may enter in order to adjust the position of the elements in connection with the inclination of the bars 30 which serve to hold the apparatus stationary, affording a point for traction. Each one of the said bars 30 has at its upper end a handle 29, and at its lower end a broad screwthreaded portion 31 fixed relative to the bar by means of a stop-screw 32.

In operation, the two bars 30 are screwed into the soil at an angle of about 90° and in such a manner that they are practically adjacent, as shown in Figure 2. The pieces 23 and 27 are then adjusted, as illustrated, and the apparatus is ready for operation. The hook 19 is fixed to any part of the vehicle and the cable is stretched by the handle 20. The ratchet device is then acted upon and the vehicle is drawn out of the rut easily and quickly.

It is obvious that many constructional and other changes may be introduced without departing from the scope of the present invention as hereinafter claimed.

Having now fully described and ascertained the nature of my present invention and in what manner the same is to be carried into practice I declare, that what I claim is:—

An anchoring device, comprising a pair of companion supporting members arranged face to face and provided each with a socket, the two sockets being diagonally disposed; one of said members being pivotally mounted and having concentric arcuate slots, and the other having stops projecting into said slots to permit a limited rotary adjustment relative to the first-named member; and an anchoring bar rotatably mounted in each socket and having a ground-engaging screw at its lower end; substantially as described.

In testimony whereof I affix my signature.

ROQUE DELLOCA (Hijo).